US008219013B2

(12) United States Patent
Moorlag et al.

(10) Patent No.: US 8,219,013 B2
(45) Date of Patent: Jul. 10, 2012

(54) FUSER MEMBER HAVING COMPOSITE OUTER LAYER

(75) Inventors: Carolyn Moorlag, Mississauga (CA); Yu Qi, Oakville (CA); Qi Zhang, Mississauga (CA); Sandra J. Gardner, Oakville (CA); Gordon Sisler, St. Catharines (CA); Guiqin Song, Milton (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 349 days.

(21) Appl. No.: 12/435,794

(22) Filed: May 5, 2009

(65) Prior Publication Data

US 2010/0286327 A1    Nov. 11, 2010

(51) Int. Cl.
*G03G 15/20* (2006.01)
*B05D 3/02* (2006.01)
*B60C 1/00* (2006.01)
*B08L 83/00* (2006.01)
*B32B 9/04* (2006.01)

(52) U.S. Cl. ........ 399/320; 524/496; 524/588; 427/387; 428/447; 977/742; 977/752

(58) Field of Classification Search .................. 428/447; 399/333, 176, 320, 327; 524/496; 525/474; 427/387; 977/742, 75, 752
See application file for complete search history.

(56) References Cited

U.S. PATENT DOCUMENTS

| 7,193,015 | B1 | 3/2007 | Mabry et al. |
| 2008/0221262 | A1 | 9/2008 | Mabry et al. |
| 2009/0123185 | A1* | 5/2009 | Lin et al. ........................ 399/176 |
| 2010/0035070 | A1* | 2/2010 | Moorlag et al. .............. 428/447 |

FOREIGN PATENT DOCUMENTS

| EP | 1529804 | 5/2005 |
| EP | 1936445 | 6/2008 |
| EP | 2042223 | 4/2009 |
| WO | 2008137209 | 11/2008 |

OTHER PUBLICATIONS

European Search Report; European Application No. 10160884.2; European Patent Office, Jul. 23, 2010, 4 Pages.

* cited by examiner

*Primary Examiner* — Ling Choi
*Assistant Examiner* — Monique Peets
(74) *Attorney, Agent, or Firm* — MH2 Technology Law Group LLP

(57) ABSTRACT

Exemplary embodiments provide composite materials used for fixing members that can include silsesquioxane-based particles and/or carbon nanotubes dispersed in a polymer matrix.

8 Claims, 3 Drawing Sheets

FUSER MEMBER HAVING COMPOSITE OUTER LAYER

FIELD OF USE

The present teachings relate generally to composite materials and fixing members and, more particularly, to composite materials and fixing members that contain silsesquioxane-based particles and methods for their formation.

BACKGROUND

In the electrostatographic/electrophotographic printing process, a toner image can be fixed or fused upon a support (e.g., a paper sheet) using a fuser roll. Conventional fusing technologies apply release agents/fuser oils to the fuser roll during the fusing operation, in order to maintain good release properties of the fuser roll. A variety of materials are used as surface layer materials of the fuser roll for toner releasing. For example, one type of surface layer materials includes fluoroelastomer, such as VITON® from E.I. DuPont de Nemours, Inc. (Wilmington, Del.). This type of materials is used in conjunction with release agents, such as PDMS-based fuser oil.

Another type of surface layer materials for toner releasing includes fluororesin, such as TEFLON® also from E.I. DuPont de Nemours, Inc. (Wilmington, Del.). This type of material is desired for oil-less fusing with no release agent required. Problems arise, however, due to insufficient mechanical robustness of the Teflon coatings which can cause, for example, denting, cracking, and abrasion.

Thus, there is a need to overcome these and other problems of the prior art and to provide composite materials used for fixing members rendering improved wear-/heat-resistance, conformability, and/or good release without use of release agents at the fusing nip.

SUMMARY

According to various embodiments, the present teachings include a fixing member. The fixing member can include a substrate and an outermost layer formed over the substrate. In one embodiment, the outermost layer can include a first type of composite material including a plurality of silsesquioxane-based particles and a plurality of carbon nanotubes dispersed in a polymer matrix, wherein the silsesquioxane-based particles can be physically dispersed in the polymer matrix and/or can be chemically bonded to a polymer of the polymer matrix.

According to various embodiments, the present teachings also include a second type of composite material. The second type of composite material can include, for example, a plurality of functionalized silsesquioxane-based particles dispersed in a polymer matrix in an amount, for example, about 5% or greater by weight of the polymer matrix, such that at least one surface of the composite material can include one or more structural surface features. The second type of composite material can also optionally include carbon nanotubes and/or "seed" silsesquioxane-based particles. In various embodiments, this type of composite material can be used as an outermost layer of a fixing member for an oil-less operation.

According to various embodiments, the present teachings also include a method for making a fixing member. In this method, a coating composition can be formed, and applied to a substrate, and then heated to form an outermost layer of a fixing member. The coating composition and the formed outermost layer can include one or more polymers, silsesquioxane-based particles, and/or carbon nanotubes.

Additional objects and advantages of the present teachings will be set forth in part in the description which follows, and in part will be obvious from the description, or may be learned by practice of the present teachings. The objects and advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1A:
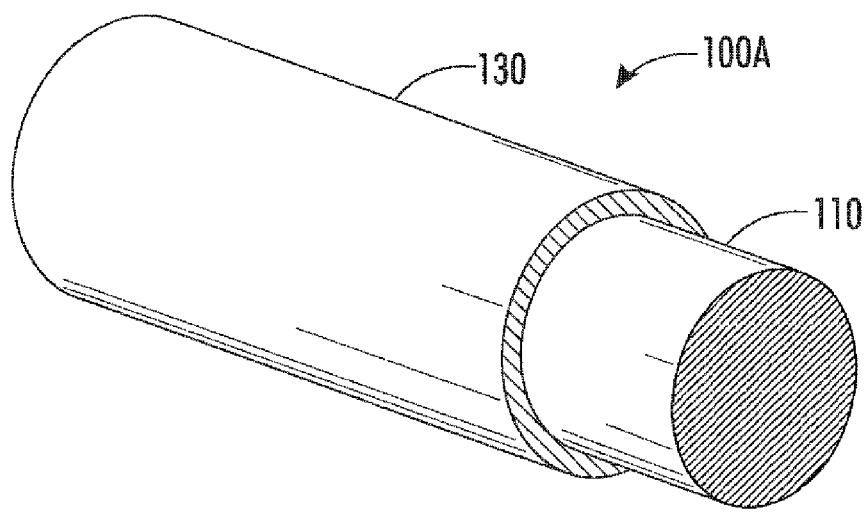
FIGS. 1A-1B depict exemplary fixing members having composite materials as outermost layers in accordance with various embodiments of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Exemplary embodiments provide composite materials and fixing members and methods for their formation. The composite material can include, e.g., silsesquioxane-based particles such as polyhedral oligomeric silsesquioxane (POSS) particles dispersed in a polymer matrix that includes one or more polymers such as fluoroelastomers. In some embodiments, the composite material can include a first type of composite material that includes a physical dispersion and/or a chemical bond between the silsesquioxane-based particles and the polymers of the polymer matrix. The first type of composite material can further include carbon nanotubes dispersed in the polymer matrix. This type of composite material can be used as an outermost layer of a fixing member.

In other embodiments, the composite material can include a second type of composite material that includes functionalized silsesquioxane-based particles that are freely-migrateable within the polymer matrix in an amount to form structural surface features on at least one surface of the composite material. The structural surface features can be in a nano-, micro- and/or nano-micro-scale. In various embodiments, carbon nanotubes can be optionally added to facilitate the formation of the structural surface features. In various embodiments, the second type of composite material having structural surface features may be used as the outermost layer of a fixing member or may be used for other applications that require surface features. But when it is used for the fixing member, an oil-less fixing operation can be achieved without use of fuser oil due to presence of structural surface features.

As disclosed herein, the polymer matrix can include, for example, one or more chemically or physically cross-linked polymers including fluorinated polymers (i.e., fluoropolymers), silicone elastomers, thermoelastomers, resins, thermosetting polymers or other cross-linked materials.

In various embodiments, the fluorinated polymers or the fluoropolymers can include, but are not limited to, fluoroelastomers (e.g., VITON®), polyperfluoroether elastomers, fluorocarbon, fluorinated thermoplastics including fluorinated polyethers, fluorinated polyimides, fluorinated polyetherketones, fluorinated polyamides, or fluorinated polyesters. In various embodiments, the one or more cross-linked polymers can be semi-soft and/or molten to mix with the silsesquioxane-based particles and/or nanotubes.

In various embodiments, the polymer matrix can include fluoroelastomers, e.g., having a monomeric repeat unit selected from the group consisting of vinylidene fluoride, hexafluoropropylene, tetrafluoroethylene, perfluoro(methyl vinyl ether), perfluoro(propyl vinyl ether), perfluoro(ethyl vinyl ether), and mixtures thereof. In addition, the fluoroelastomers can include cure site monomers to cure or cross link polymers chains of the fluoroelastomers.

Commercially available fluoroelastomer can include, for example, products under various designations as VITON® A (copolymers of hexafluoropropylene (HFP) and vinylidene fluoride (VDF or VF2)), VITON® B, (terpolymers of tetrafluoroethylene (TFE), vinylidene fluoride (VDF) and hexafluoropropylene (HFP)); and VITON® GF, (tetrapolymers including TFE, VF2, HFP), as well as VITON® E, VITON® E 60C, VITON® E430, VITON® 910, VITON® GH and/or VITON® GF. The VITON® designations are Trademarks of E.I. DuPont de Nemours, Inc. (Wilmington, Del.).

Other commercially available fluoroelastomer can include, for example, Dyneon™ fluoroelastomers from 3M Company (Two Harbors, Minn.). Additional commercially available materials can include Atlas® a poly(propylene-tetrafluoroethylene) and Fluorel® II (LII900) a poly(propylene-tetrafluoroethylenevinylidenefluoride), both also available from 3M Company, as well as the Tecnoflons identified as For®-60KIR, For®-LHF, or -NM, For® THF, For®-TFS, -TH, or -TN505, available from Solvay Solexis (Bollate, MI, Italy).

In one exemplary embodiment, the polymer matrix can include a vinylidene-fluoride-containing fluoroelastomer cross-linked with an effective curing agent (also referred to herein as a cross-linking agent, bonding agent, or cross-linker), that includes, but is not limited to, a bisphenol compound, a diamino compound, an aminophenol compound, an amino-siloxane compound, an amino-silane and a phenol-silane compound.

An exemplary bisphenol cross-linker can include VITON® Curative No. 50 (VC-50) available from E.I. du Pont de Nemours, Inc. Curative VC-50 can contain Bisphenol-AF as a cross-linker and diphenylbenzylphosphonium chloride as an accelerator. Bisphenol-AF is also known as 4,4'-(hexafluoroisopropylidene)diphenol.

Cross-linked fluoropolymers can form elastomers that are relatively soft and display elastic properties. In a specific embodiment, the polymer matrix can include VITON® GF (E.I. du Pont de Nemours, Inc., Wilmington, Del.), including tetrafluoroethylene (TFE), hexafluoropropylene (HFP), vinylidene fluoride (VF2), and a brominated peroxide cure site.

As disclosed herein, silsesquioxane-based particles can be dispersed in the polymer matrix that contains one or more polymers as described above.

In various embodiments, the silsesquioxane-based particles can be nanosized, e.g., having a size range of about 1000 nm (1 micron) or less. For example, the silsesquioxane-based particles can have a nanoparticle size of from about 0.5 nm to about 5 nm, in some cases, from about 1 nm to about 2 nm. In various embodiments, the silsesquioxane-based particles can be dispersed in, anchored on, or bonded to polymer chains of the polymer matrix. In other embodiments, the silsesquioxane-based materials can be physically doped or chemically anchored into the polymer matrix of the composite material. In various embodiments, a variety of silsesquioxane-based particles can be available through Aldrich (St. Louis, Mo.), Gelest (Morrisville, Pa.), or other companies.

The silsesquioxane-based particles can be functionalized with side groups, which are also referred to as "functionalized silsesquioxane-based particles". For example, the silsesquioxane-based particle can be an oligomer and can include linear or branched chains of silicon-oxygen bonds. The silicon atoms along the silsesquioxane oligomers can be substituted with functional groups, including, but not limited to, hydrogen, fluorine, alkyl, aryl, fluorocarbon functional groups or combinations thereof. The choices of functional groups can affect the properties of silsesquioxane-based particles and the functionalization of silsesquioxane-based particles can allow for flexibility to solubilize silsesquioxane-based particles for processing and improving compatibility with host systems such as host polymers, for example, fluoropolymers or specialized fluoropolymers such as fluoroelastomers.

In various embodiments, adding fluorinated groups to the silsesquioxane-based particles can result in a compatible particle-shell complex to evenly distribute particles throughout the polymer matrix. In addition, silsesquioxane-based particles functionalized with fluorinated groups can enhance oil-less release for low-oil fusing systems. In various embodiments, the silsesquioxane-based particles can also be functionalized with, for example, siloxane groups, to enhance release in fusing systems. In various embodiments, the silsesquioxane-based materials can be functionalized with hydrophobicity, for example, by use of alkyl, aryl, fluorinated alkyl, fluorinated aryl, perfluoroether, or combinations thereof.

These functional groups described above can promote particle migration of the silsesquioxane-based material from the bulk to the surface of the composite material due to low surface energy of such functionalized particles.

In various embodiments, the silsesquioxane-based particles can further be functionalized with reactive groups that cross-link to polymer chains of the polymer matrix, and therefore, fixing the silsesquioxane-based particles within the matrix and/or cross-linking the polymer. The reactive groups can include, such as, for example, amino, siloxyl, or hydroxyphenyl groups being capable of covalently bonding to one or more polymer chains of the polymer matrix, or to one or more functional groups that are covalently attached to the one or more polymer chains. In an exemplary embodiment, the functional groups can include bisphenol-A (BPA) and the functionalized silsesquioxane-based molecules can be capable of bonding directly to the exemplary fluoroelastomer chains and fixing the particles throughout the polymer matrix.

In various embodiments, the silsesquioxane-based particles can be polyhedral in shape and can be oligomeric, and can include polyhedral oligomeric silsesquioxane (POSS). Specifically, the POSS materials can be large, discrete molecules exhibiting properties of silica and silicone. The stiff, heat-resistant $(Si_2O_3)_n$ inorganic core of POSS can increase the mechanical modulus, hardness and thermal stability of the polymer matrix. More specifically, when the silica-like polysilsesquioxane-based particles are used as an outermost layer for a fixing member, the hardness and thermal stability of the outer fuser layer can be increased and, accordingly, the durability of the fixing member can be increased. In addition, the silsesquioxane-based particles can have silicone-like character similar to polydimethylsiloxane (PDMS) fuser fluid used in known fusing systems, such as, for example, iGen machines.

In various embodiments, polyhedral shapes of POSS can include octagonal (T8), decagonal (T10), and/or (T12) cages, with the T8 structure most commonly formed. The formation of different frameworks of POSS structures can be controlled by factors in preparation, such as pH, temperature, solvent, and hydrolysis method.

For example, octahedral (T8) POSS can have the general formula $Si_8O_{12}$ and the basic general polyhedral structure as shown in Formula I:

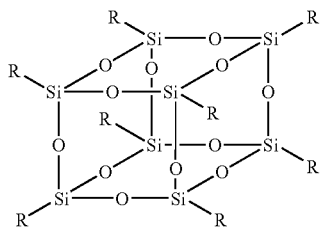

Wherein R is a functional group selected from the group consisting of hydrogen, substituted or unsubstituted alkyl group having from about 1 to about 20 carbons, or from about 1 to about 10 carbons, such as methyl, ethyl, propyl, butyl, tertbutyl, isobutyl, and the like; a substituted or unsubstituted aryl group having from about 6 to about 60 carbons, or from about 6 to about 40 carbons, with the most common example being phenyl; a fluorinated alkyl group having from about 1 to about 30 carbons, or from about 1 to about 20 carbons, a fluorinated aryl group having from about 6 to about 60 carbons, or from about 6 to about 10 carbons; a substituted or unsubstituted siloxy group having from about 1 to about 30 carbons, such as siloxy, bisiloxy, and trisiloxy; an amino group having from about 1 to about 10 carbons, a hydroxyphenyl group having from about 6 to about 60 carbons; and mixtures thereof, wherein substituted groups can be amino groups, halogen groups (such as chlorine, bromine, fluorine, and the like), hydroxyl groups, or other groups.

In various embodiments, functional groups can be chosen to cap the POSS particles to enhance compatibility of POSS to the polymer matrix or the polymer coating composition during its preparation. Examples of side groups set forth above as R groups in Formula I can be alkyl, aryl, fluoroalkyl, and fluoroaryl groups.

In various embodiments, functional groups capping POSS cages can be different and can be represented by the following Formula II:

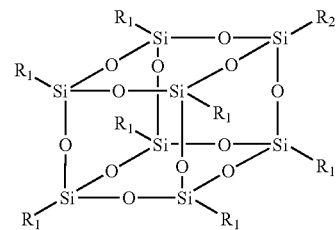

Wherein $R_1$ can be a non-reactive functional group, such as a substituted or unsubstituted alkyl having from about 1 to about 20 carbons, or from about 1 to about 10 carbons, substituted or unsubstituted aryl having from about 6 to about 60 carbons, or from about 6 to about 10 carbons, fluorinated alkyl having from about 1 to about 30 carbons, or from about 1 to about 20 carbons, or fluorinated aryl group having from about 6 to about 60 carbons, or from about 6 to about 10 carbons; and $R_2$ can be a reactive group, such as a functional cross-linking group. POSS with Formula II can be normally formed from silanols that are incompletely condensed POSS frameworks missing one functionality-capped Si corner group. Silanols can be reacted with trialkoxysilane or trihalosilane to form POSS with Formula II.

In various embodiments, $R_1$ of Formula II (or R of Formula I) can be a fluorinated group selected from a group consisting of a linear fluorinated alkyl chain with the formula $F_3C(F_2C)_n(CH_2)_m$—, wherein n can be a number from 0 to about 17, or from 0 to about 10, and m can be a number from 0 to about 4; a branched fluorinated alkyl chain having the formula $(F_3C)_2(CH)(F_2C)_n(CH_2)_m$, wherein n can be a number from 0 to about 15, or from about 1 to about 10, and m can be a number from 0 to about 4; a linear perfluoroether chain with the formula $F_3C(F_2C)_n(CH_2)_mO_q$, wherein n can be a number from 0 to about 17, or from 0 to about 10, and m can be a number from 0 to about 4, and q can be a number from about 1 to about 10, or from about 1 to about 3; a branched perfluoroether chain with the formula $(F_3C)_2(CH)(F_2C)_n(CH_2)_mO_q$, wherein n can be a number from 0 to about 17, or from 0 to about 10, and m can be a number from 0 to about 4, and q can be a number from about 1 to about 10, or from about 1 to about 3; and a fluorinated aryl group with the formula $C_nF_{n-1}$, wherein n can be a number from about 5 to about 10. Examples of fluorinated alkyl and aryl groups can include, but are not limited to, the following:

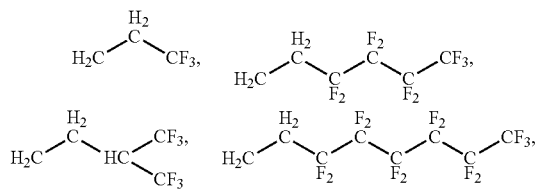

-continued

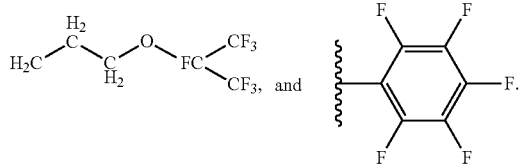

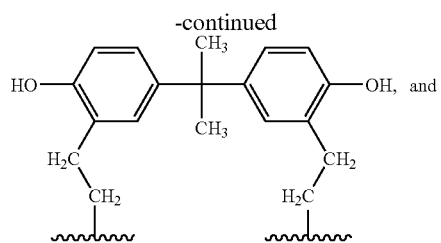

In various embodiments, $R_2$ of Formula II can include a reactive group or a functional cross-linking group capable of covalently bonding to one or more polymer chains of a polymer matrix, or may be covalently bonded to one or more functional groups that are covalently attached to polymer chains. Examples include, but are not limited to, functional groups including one or more of an amino group with the formula $C_nH_{2n}NH_2$ or $C_nH_{2n}NHCH_2CH_2NH_2$, wherein n can be a number from 0 to about 10, or from about 2 to about 6; a siloxane group with a formula of $C_nH_{2n}SiX_3$, wherein n can be a number from 0 to about 30, or from about 2 to about 10, and X can be a halo or alkoxy group; and hydroxyphenyl groups such as bifunctional cross-linking groups with the formula $(OH)(C_nH_{2n})C_6H_3C(CX_3)_2C_6H_3(C_nH_{2n})(OH)$, wherein n can be a number from 0 about 60, or from 2 to about 10, and X can be H or F. Specific examples of the functional cross-linking groups can be selected from the group consisting of the following:

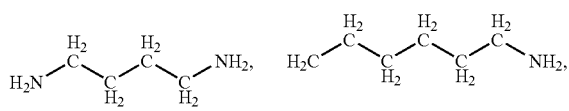

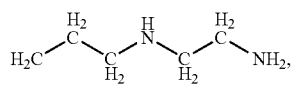

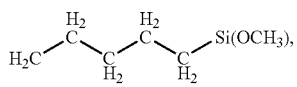

Commercially available examples of Formula II with corner capping of reactive functional groups can include heptaisobutyl(3-(2-aminoethyl)amino)propyl-PSS (see Formula A) from Aldrich (St. Louis, Mo.), wherein the amino functional group of A can be bound to a fluoropolymer matrix. Commercially available precursors to Formula II can include (3-chloropropyl)-heptacyclopentyl-PSS (see Formula B1), chloropropyl-heptaisobutyl-PSS (see Formula B2), (4-chlorobenzyl)-heptacyclopentyl-PSS (see Formula C), and hydrido-heptacyclopentyl-PSS (see Formula D) from Aldrich (St. Louis, Mo.), wherein the chloro-functional groups of B1, B2, and C can be functionalized to amino, siloxyl, or hydroxyphenyl cross-linking groups. The hydrido functionality of D can be cross-linked by hydrosilation reactions. Therefore, vinyl-functionalized cross-linking groups such as vinyl-substituted bisphenol A (BPA) can be directly linked to the POSS molecule to give the proposed material Formula E below. Since E is multifunctional, this type of material can also be used to cross-link fluoropolymer chains while incorporating POSS into the polymer matrix. Such POSS particles and the like can then serve, in various embodiments, as multiple purposes of cross-linker, reinforcer, and/or release agent.

A

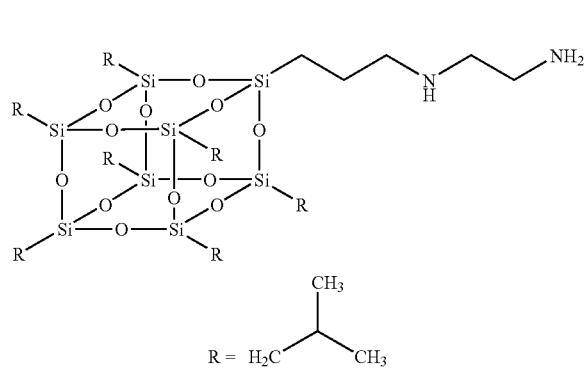

B

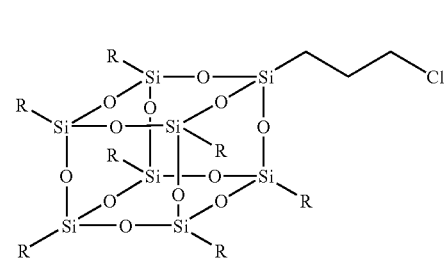

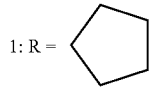

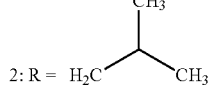

-continued
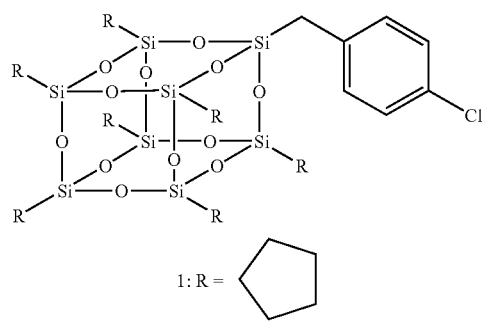
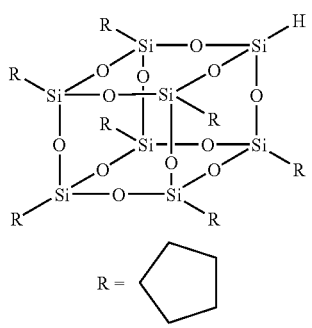
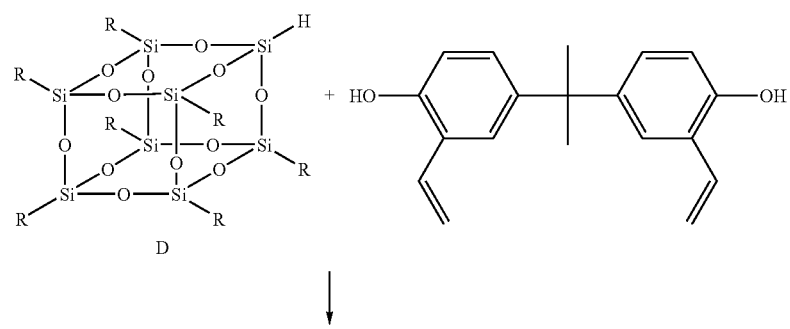
↓
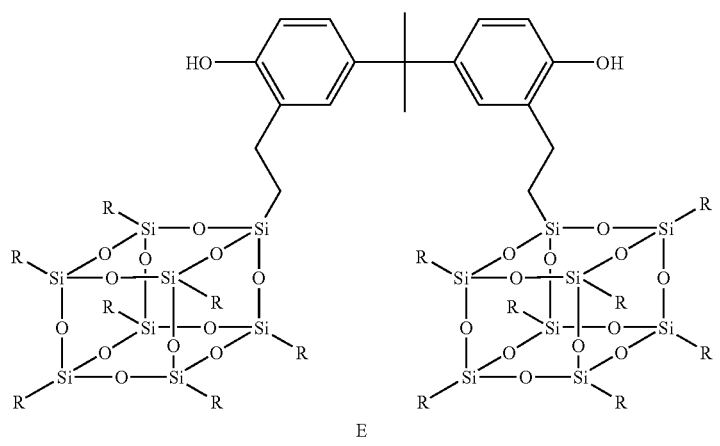

Other embodiments of functionalized POSS can include the following with POSS partially functionalized with BPA functional group or amino functional group.

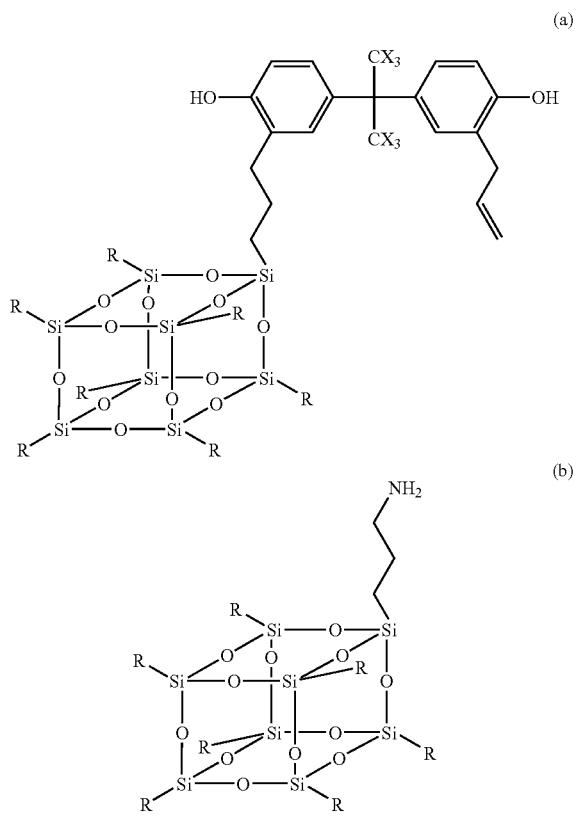

In various embodiments, the addition of fluorinated chains to the cores of POSS can be carried out by acid- or base-catalyzed hydrolysis of commercially available silyl precursors such as trialkoxysilanes or trichlorosilanes that are functionalized with fluorinated chains, followed by condensation to form silsesquioxane cages. In one embodiment, fluorinated POSS molecules can be prepared by acid-catalyzed hydrolysis of commercially available (3,3,3-trifluoropropyl)trichlorosilane, followed by condensation to form silsesquioxane cages as shown below.

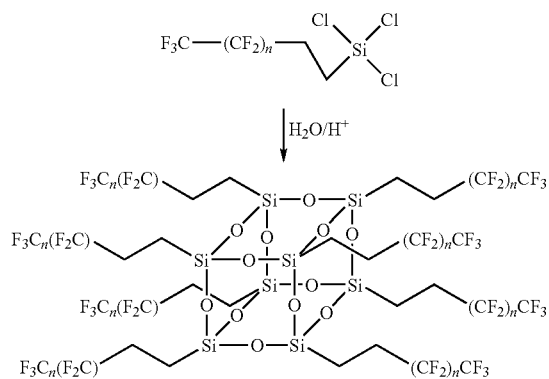

Advantages of fluorinated POSS particles can be that they are relatively dense as compared to other substituted POSS particles, and can provide additional robustness to a reinforced fluoropolymer layer. Fluorinated POSS can also display very low surface energy that aids in the creation of a non-stick surface, i.e., a hydrophobic surface. This can, in turn, decrease the wetting of fuser fluid and improve release.

Fluorinated POSS containing cross-linking groups can be accomplished by the synthesis of incompletely condensed fluorinated POSS containing reactive sites for functionalization, followed by the incorporation of functional groups, such as, for example, silyl amine groups, silyl phenol groups, or another group such as those set forth as $R_2$ in Formula II above, that bind to polymer chains. This procedure can fix fluorinated POSS nanoparticles within the fluoropolymer matrix. The incorporation of multiple cross-linking functionalities can allow the additional use of fluorinated POSS materials as fluoropolymer cross-linkers. Below is a schematic illustration of a fluorinated POSS functionalized with an amine cross-linking group.

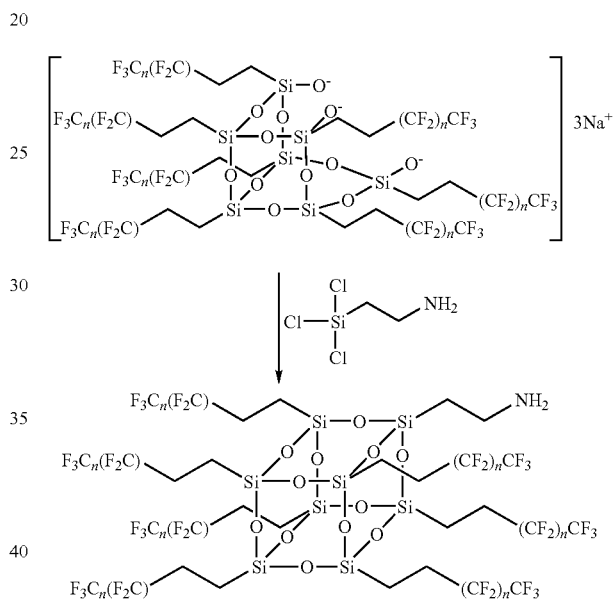

Examples of cross-linking agents can include a biphenol such as hydroquinone, a bisphenol such as bisphenol A (2,2-bis(4-hydroxyphenyl)propane) or bisphenol AF (2,2-bis(4-hydroxyphenyl)hexafluoropropane, (or in commercial formulations such as VC50 from DuPont Co., Wilmington, Del.), an aminosilane such as AO700 (aminoethyl aminopropyl trimethoxysilane cross-linker from Gelest, Morrisville, Pa.), a diamine such as hexamethylenediamine, and a masked diamine such as N,N'-dicinnamylidene-1,6-hexanediamine. A "masked" diamine refers to the coordination of functional groups to amine functionalities. In various embodiments, a fluoropolymer can be dissolved in a solvent and a cross-linking agent can be added along with other components that enable cross-linking.

As disclosed herein, carbon nanotubes may also be dispersed in the polymer matrix. Generally, carbon nanotubes can provide, for example, mechanical, electrical, and thermal functions to the composite material. As used herein and unless otherwise specified, the term "nanotubes" refers to elongated materials (including organic and inorganic materials) having at least one minor dimension, for example, width or diameter, about 100 nanometers or less. In various embodiments, the term "nanotubes" can also include single wall carbon nanotubes (SWCNTs), and/or multi-wall carbon nanotubes (MWCNTs). In addition, the nanotubes can be modified/functionalized nanotubes with controlled and/or increased mechanical, electrical or thermal properties through various physical and/or chemical modifications.

In various embodiments, the composite materials can be formed by coating a composition on a substrate. The coating composition can include, for example, one or more fluoropolymers, a plurality of silsesquioxane-based particles, and/or a plurality of carbon nanotubes dispersed in a solvent.

In various embodiments, other fillers, such as inorganic particles, can be optionally added to the coating composition. In various embodiments, the inorganic particles can include, but are not limited to, metal oxides, non-metal oxides, metals, or other suitable particles. Specifically, the metal oxides can include, for example, silicon oxide, aluminum oxide, chromium oxide, zirconium oxide, zinc oxide, tin oxide, iron oxide, magnesium oxide, manganese oxide, nickel oxide, copper oxide, antimony pentoxide, indium tin oxide, and mixtures thereof. The non-metal oxides can include, for example, boron nitride, silicon carbides (SiC) and the like. The metals can include, for example, nickel, copper, silver, gold, zinc, iron and the like. In various embodiments, other additives known to one of ordinary skill in the art can also be included in the coating composition.

The coating composition or dispersion can be prepared to include, for example, an effective solvent, in order to disperse the silsesquioxane-based particles, the nanotubes, polymers and/or corresponding curing agents; and/or optionally, inorganic filler particles or surfactants known to one of the ordinary skill in the art. Effective solvents can include, but are not limited to, methyl isobutyl ketone (MIBK), acetone, methyl ethyl ketone (MEK), and mixtures thereof. Other solvents that can form suitable dispersions can be within the scope of the embodiments herein.

The coating composition can be coated over a substrate. The substrate can be in a form including, but not limited to, a belt, plate, film, sheet, drum, drelt (cross between a belt and a drum), roller or other known form for a fuser member. In various embodiments, the substrate to be coated can include a wide variety of materials, such as, for example, metals, metal alloys, rubbers, glass, ceramics, plastics, or fabrics. For example, the metals used can include aluminum, anodized aluminum, steel, nickel, copper, and mixtures thereof, while the plastics used can include polyimides, polyester, polyetheretherketone (PEEK), poly(arylene ether)s, polyamides and mixtures thereof. In various embodiments, one or more functional layers can be disposed between the substrate and the coated layer.

Various coating techniques can be applied to form the disclosed composite material over the substrate. The coating techniques can include, but are not limited to, dip coating, painting, brush coating, roller coating, pad application, spray coating, spin coating, casting, or flow coating. In various embodiments, a drying process can be performed and followed by a solidifying process, after the coating composition is applied on a desired surface. For example, the coated member can be dried and then baked at a temperature, e.g., at a curing temperature of up to 232° C. when VITON® is used as the host polymer for the polymer matrix of the composite material.

The coated member can include various composite materials coated over the substrate, depending on the composition and/or coating conditions. For example, a first type of composite material can include silsesquioxane-based particles and carbon nanotubes dispersed in a polymer matrix. A second type of composite material can include functionalized silsesquioxane-based particles dispersed in a polymer matrix and can have structural surface features.

In various embodiments, the coated member that includes the first and second type of composite materials can be used in an electrostatographic printing device or process and can be used as a fixing member including, for example, a fuser member, a pressure member, a heat member or a donor member. For example, the composite materials can be used as an outermost layer of a fixing member.

Figure 1B:
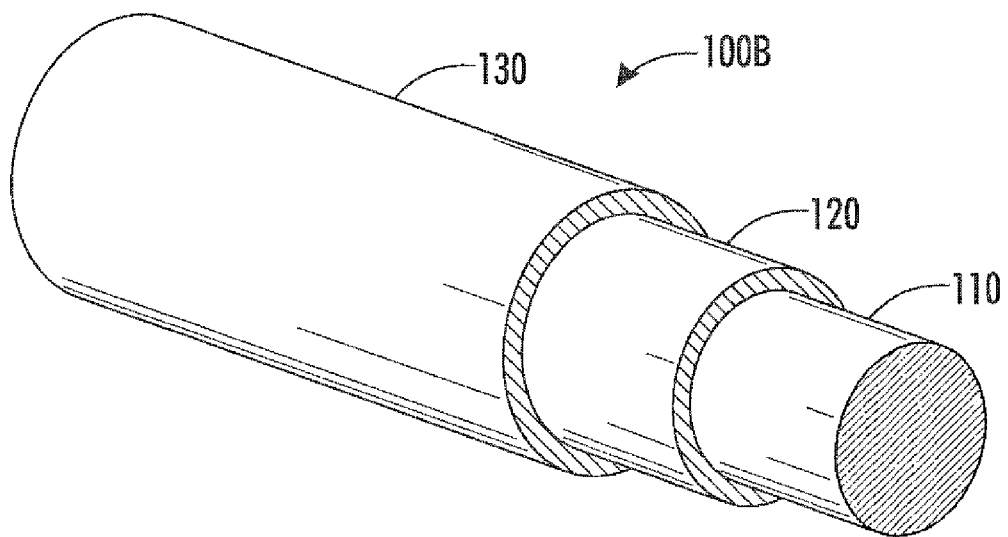

FIGS. 1A-1B depict exemplary fixing members 100A-B having an exemplary core substrate 110 in accordance with the present teachings. It should be readily apparent to one of ordinary skill in the art that the devices 100A-B depicted in FIGS. 1A-1B represent generalized schematic illustrations and that other components/layers/substrates can be added or existing components/layers/substrates can be removed or modified.

The coated fixing members 100A-B can be, for example, fuser rollers with one or more functional layers 120 and/or 130 formed on the core substrate 110. In various embodiments, the core substrate 110 can take the form of a cylindrical tube or a solid cylindrical shaft. One of ordinary skill in the art will understand that other substrate forms, e.g., a belt substrate, can be used to maintain rigidity and/or structural integrity of the coated member.

As shown, the outermost layers 130 in FIG. 1A and in FIG. 1B can be a coated layer formed from a coating composition that contains polymers, silsesquioxane-based particles, and/or nanotubes in a suitable solvent. The coated layer can be formed directly on the substrate surface 110 (see 130 in FIG. 1A) or can be formed on a functional layer 120 that is formed on the substrate surface 110 (see 130 in FIG. 1B). For example, the fuser roll can have a 2-layer configuration having an intermediate layer, an adhesion layer and/or a resilient layer (e.g., a silicone rubber layer) used as the functional layer 120, disposed between the coated outermost layer 130 and the core substrate 110, such as a metal used in the related art.

In one embodiment, because the outermost layer 130 can include the composite material that contains, for example, fluoroelastomers, silsesquioxane-based particles and/or carbon nanotubes, the outermost layer 130 can allow for use of fluoroelastomers with desired processability and mechanical properties, for example, for fusing. In an exemplary embodiment, the silsesquioxane-based particles can be in a range from about 3% to about 30% by weight of the outermost layer, and carbon nanotubes can be in a range from about 0.5% to about 25% by weight of the outermost layer.

In various embodiments, the addition of silsesquioxane-based particles can provide an increase in elastic modulus and/or toughness of the outermost layer, and can improve the durability, resulting in increased life time of the exemplary fuser member, without compromising the homogeneity of the material.

As disclosed herein, the second type of composite material can include functionalized (e.g., fluorinated) silsesquioxane-based particles dispersed within a polymer matrix in an amount such that at least one surface of the composite material can include one or more structural surface features. In various embodiments, the second type of composite material can optionally include nanotubes. When nanotubes are dispersed in the polymer matrix, they can be used to facilitate the formation of the structural surface features. In various embodiments, the second type of composite material can also optionally include "seed" silsesquioxane-based particles, e.g., having reactive functional groups.

In one embodiment, the second type of composite material can be mechanically robust with structural surface features that modify the surface energy of the layer. In various embodiments, the structural surface features can be regular or irregular and formed from, e.g., clusters of functionalized silsesquioxane-based particles that are migrated and/or aggregated from bulk to the surface of the material.

The structural surface features can provide a desired surface wettability for the disclosed second type of composite material. The surface wettability can include, for example, hydrophobicity; ultrahydrophobicity and/or superhydrophobicity, to have a respective water contact angle of approximately 90° or greater; 120° or greater; and/or 150° or greater. For example, the structural surface features can provide "lotus effect" for surface self-cleaning, where the surface exhibits superhydrophobicity.

In one embodiment, the surface features can be in nano- or micro-scale having various regular or irregular topographies, such as periodical and/or ordered nano-, micro-, or nano-micro-surface structures. For example, the disclosed surface can have protrusive or intrusive features for providing desired surface wettability. In an exemplary embodiment, about 50% at least of the surface features can have a height or a depth of from about 250 nm to about 15 µm, and about 25% at least of the surface features can have a mean diameter of from about 250 nm to about 50 µm.

In various embodiments, the disclosed silsesquioxane-based particles can prevent water from a complete touching. That is, the contact area of water to the surface (i.e., the solid-liquid interface area) can be reduced. The reduced contact surface area can result in a very low adhesion between the water and the structured surface.

In various embodiments, the surface features can have various cross-sectional shapes, such as, for example, square, rectangular, circle, star, or any other suitable shapes, which can provide desired surface wettability. In an exemplary embodiment, the surface can have a roughness scale similar to that of a lotus leaf, which is superhydrophobic and has a water contact angle of about 170° or higher.

In various embodiments, the functionalized silsesquioxane-based particles for generating structural surface features, such as POSS clusters, can include suitable fluorine-containing silsesquioxane-based particles, such as fluorinated silsesquioxanes. In one embodiment, referring back to Formula I using Octahedral (T8) POSS as an example for the fluorinated silsesquioxanes, at least one of the side groups shown in Formula I can contain fluorine. In various embodiments, the fluorinated functional groups can include, but are not limited to, a linear or branched fluorinated alkyl, a linear or branched perfluoroether and/or a fluorinated aryl group as disclosed herein. In various embodiments, the functionalized fluorine-containing silsesquioxane-based particles can include side groups described for $R_1$ of Formula II as disclosed herein.

In one embodiment, the structural surface features can be produced by dispersing silsesquioxane-based particles in the outermost layer in an amount of about 5% or greater with no carbon nanotubes involved.

In another embodiment, carbon nanotubes can be added to facilitate migration of fluorine-containing silsesquioxane-based particles from the bulk to the surface of the second type of composite material. In this case, the structural surface features can be produced by dispersing carbon nanotubes of from about 0.5% to about 25% by weight of the polymer matrix and fluorine-containing silsesquioxane-based particles of about 5% or greater by weight of the polymer matrix. Further, the addition of carbon nanotubes can modify mechanical properties of the exemplary fuser roll and mitigate fuser roll failure due to wear and due to the produced surface features caused by the silsesquioxane-based clusters.

In this manner, the addition of fluorine-containing silsesquioxane-based particles and/or carbon nanotubes can allow for hydrophobicity or ultra-/superhydrophobicity at the surface, can lead to self-cleaning. Water droplets can efficiently roll off the surface. The self-cleaning can be extended to self-release at the fuser member surface, where toner components are prevented from adhering to the fusing surface, such as a paper substrate. In various embodiments, the outermost coated layer can further include increased fluorinated content and lower surface energy, in addition to the surface features which improve self-release via hydrophobicity.

Figure 2:
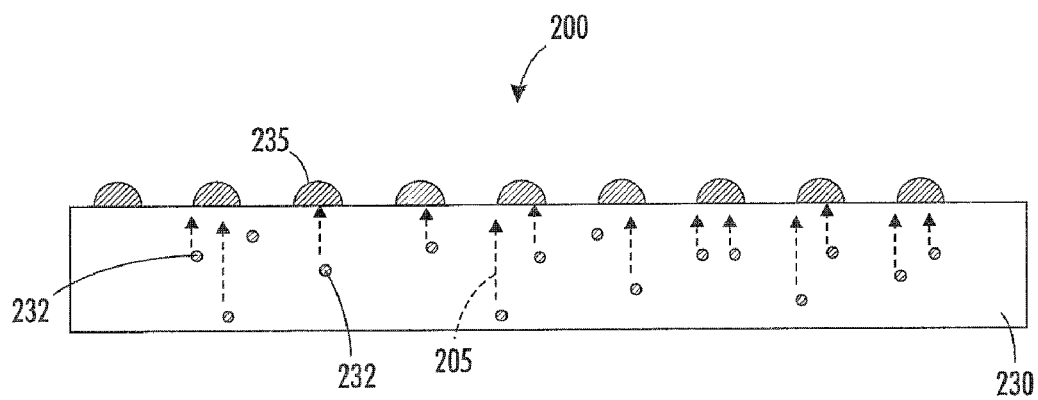
FIG. 2 depicts an exemplary composite material in accordance with various embodiments of the present teachings.

FIG. 2 depicts an exemplary second type of composite material in accordance with the present teachings. As shown, the second type of composite material 200 can include, for example, functionalized silsesquioxane-based particles 232, such as functionalized POSS particles, dispersed in a polymer matrix 230, such as a fluoroelastomer matrix. The second type of composite material 200 can also include surface features 235. In various embodiments, the polymer matrix 230 may or may not include carbon nanotubes (CNTs).

The surface features 235 can be, for example, POSS clusters, due to the clustering (see 205) of POSS particles of the composite material. With the incorporation of freely-migrating functionalized silsesquioxane-based particles 232 (e.g., fluorinated POSS) to the polymer matrix 230, clusters can be primarily localized at the surface of the composite material 200 to form the surface features 235.

Although not intending to be bound to any particular theory, it is believed that the clustering and the surface localization of the functionalized silsesquioxane-based particles 232 can be generated due to energy minimization of low surface energy. The exemplary functionalized POSS particles can thus segregate from the bulk and migrate (see 205) to the surface. In various embodiments, the POSS particles may clump together or agglomerate during the migration. In one example, the fluorinated silsesquioxane-based molecules can be functionalized with fluorocarbon chains so as to possess a very low surface energy. In another example, the fluorinated silsesquioxane-based molecules can be functionalized, e.g., around the POSS core, to render the composite material hydrophobic properties. In an additional example, other fillers added in the bulk polymer matrix (e.g., fluoroelastomer) as disclosed herein can modify chemical or physical interactions within the bulk matrix, and can be incorporated into the system to promote clustering of POSS and the formation of surface features.

Figure 3:
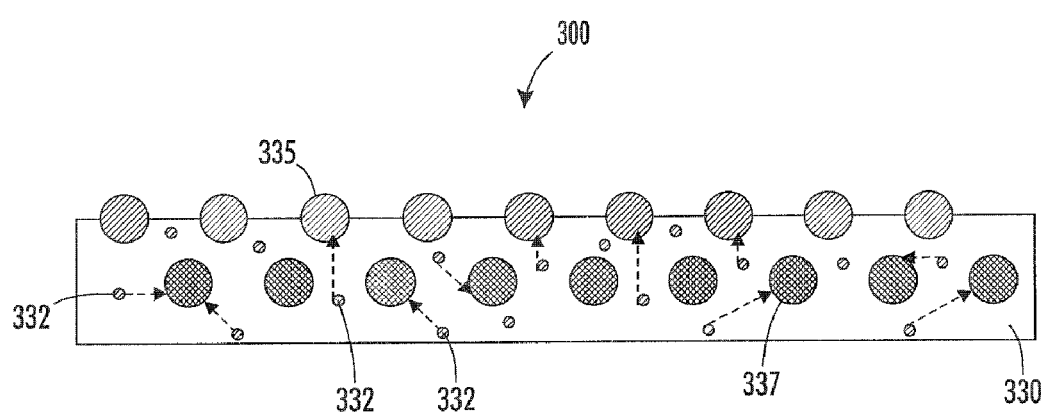
FIG. 3 depicts another exemplary composite material in accordance with various embodiments of the present teachings.

FIG. 3 depicts another embodiment of the second type of composite material in accordance with the present teachings. As shown, the second type of composite material 300 can include, for example, functionalized silsesquioxane-based particles 332, such as functionalized POSS particles, dispersed in a polymer matrix 330, such as a fluoroelastomer matrix. The second type of composite material 300 or the polymer matrix 330 can include surface features 335. In various embodiments, the polymer matrix 330 may or may not include carbon nanotubes (CNTs).

In various embodiments, the composite material 300 can further include "seed" silsesquioxane-based particles 337 for the formation of silsesquioxane clusters throughout the composite material.

The "seed" silsesquioxane-based particles 337 can include reactive sites, i.e., polymer binding groups that bind to or cross-link with the polymer chains of the composite material 300. In various embodiments, the "seed" silsesquioxane-based particles 337 can be "fixed" within the polymer matrix 330 and used as seeds for particle migration through the bulk polymer matrix. For example, the seed silsesquioxane-based particles 337 can be partially functionalized with BPA functional group or amino functional group as described herein. In various embodiments, the seed silsesquioxane-based particles 337 can be fluorine-containing seed silsesquioxane-based particles with reactive sites or cross-linking groups. In various embodiments, the seed silsesquioxane-based particles 337 can include those set forth in Formula II.

In this manner, the functionalized "seed" silsesquioxane-based particles 337 can be capable of bonding directly to the polymer chains, e.g., fluoroelastomer chains of the polymer matrix 330 and be capable of fixing the seed particles throughout the coated composite material 300. As compared with the composite material 200 shown in FIG. 2 having surface cluster localization, the surface features 335 can be "replenishable" on the fixing member as wearing of the fixing surface occurs due to the existence of the seed silsesquioxane-based particles 337.

EXAMPLES

Example 1

Preparation of Fluorinated POSS

Fluorinated POSS molecules were prepared by the acid-catalyzed hydrolysis of commercially available (3,3,3-trifluoropropyl)trichlorosilane, followed by condensation to form silsesquioxane cages, as shown in the following:

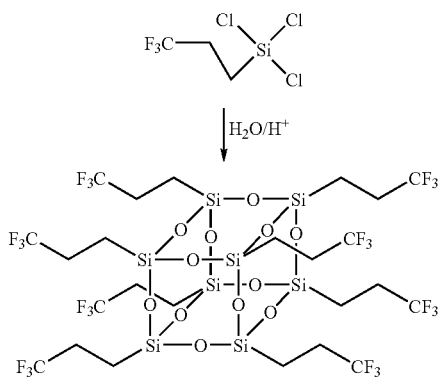

The molecular structure was confirmed by 1H, 13C, 19F, and 29Si NMR spectroscopy in deuterated acetone.

Example 2

Preparation of Coating Composition and Fuser Topcoat Layer

In this example, the coating composition included VITON® GF of 7 pph VC-50 cross-linker of 1.5 pph, fluorinated POSS particles formed in Example 1 with various concentrations (e.g., 5% and 20% by weight of VITON® GF), MgO of 0.75 pph, and surfactant in MIBK solvent.

VITON® fuser topcoats were prepared by pouring mixtures dispersed in MIBK, i.e., the coating composition, into moulds, allowing to dry, then heat-treating at standard VITON® curing temperatures up to 232° C.

The CNT-containing coating compositions and resulting fuser topcoats were also prepared to include 3% CNTs having the fluorinated POSS of about 5% and about 10% respectively by weight of VITON® GF.

Example 3

Surface Features of the Prepared Composite Material/Fuser Topcoat Layer

Four VITON® composite material samples were prepared according to Example 2 to have 5% POSS; 20% POSS; 5% POSS plus 3% CNT; and 20% POSS plus 3% CNT, respectively.

For VITON® composite material/outermost layer having 5% POSS with no CNTs involved, the coating surface was observed to be rough, while no regular surface features were formed.

When the concentration of the fluorinated POSS is increased to 20% by weight of VITON®, the VITON® composite material displayed a surface with moderately spherical features of from about 40 μm to about 50 μm in size, interspersed with much smaller spherical features having a size of from about 5 μm to about 10 μm.

For VITON® composite material/outermost layer having 5% POSS incorporated with 3% CNTs, dramatic enhancement of the surface effect was observed displaying an abundance of from about 15 μm to about 20 μm uniform spherical surface features interspersed with spherical features having a low concentration of small dimensions of less than about 5 μm.

Figure 4:
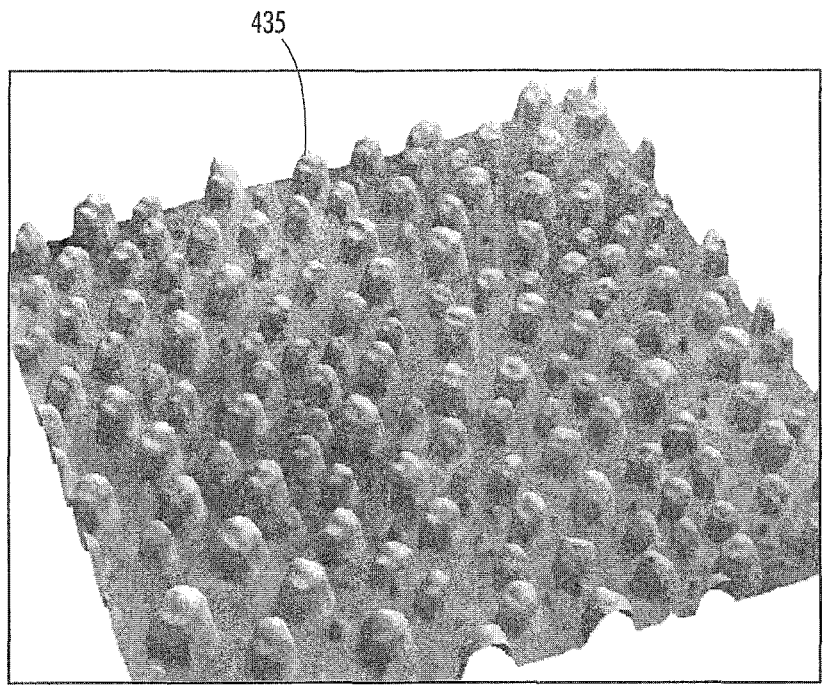
FIG. 4 is a schematic showing structural surface features of an exemplary composite material in accordance with various embodiments of the present teachings.

For VITON® composite material/outermost layer having 20% POSS incorporated with 3% CNTs, uniform spherical features were observed to have much larger size of from about 40 μm to about 50 μm with a low concentration of small sized spherical features of from about 5 μm to about 10 μm, as exemplarily shown in FIG. 4.

Specifically, FIG. 4 depicts a schematic showing the structural surface features 435 of the VITON® composite material having 20% POSS incorporated with 3% CNTs by weight of the polymer VITON®.

Example 4

EDS Results for Surface Features of the Prepared Composite Material/Fuser Outermost Layer The surface features were further analyzed by energy dispersive spectroscopy (EDS) to determine elemental content.

For VITON® composite material/outermost layer having 5% POSS with no CNTs involved, the coating surface was observed to have a moderate amount of silicon (Si) at the surface.

When the concentration of the fluorinated POSS is increased to 20% by weight of VITON®, the coating surface was observed to have increased Si content and the Si was observed to be localized within the structural surface features, indicating the presence of POSS.

Figure 5:
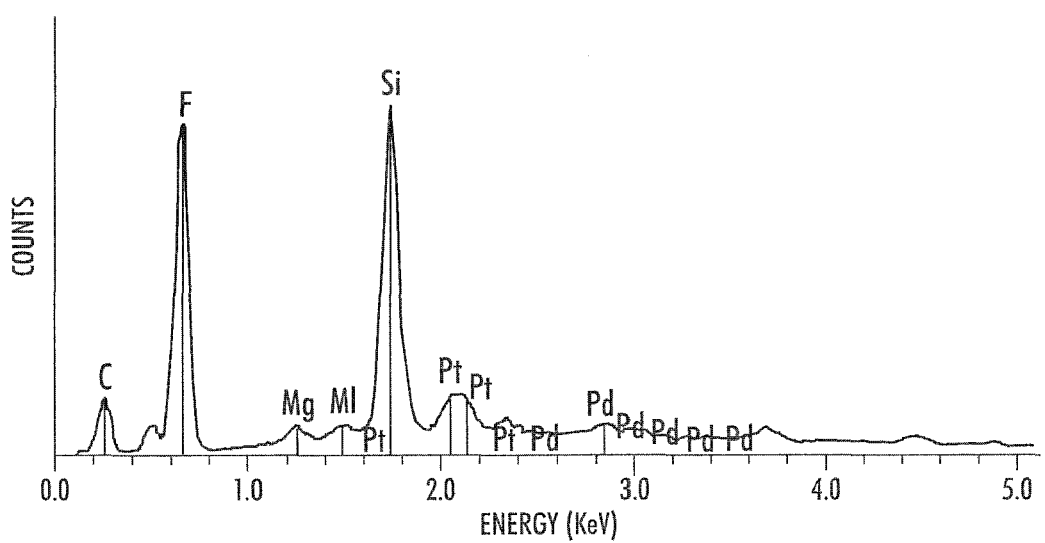
FIG. 5 depicts an energy dispersive spectroscopy (EDS) result for an exemplary composite material in accordance with various embodiments of the present teachings.

For VITON® composite material/outermost layer having 5% POSS and 20% POSS with each incorporated with 3% CNTs, Si content at the surface was observed to be greatly increased and the dominant spherical features become more uniform in size as shown in FIG. 5.

Specifically, FIG. 5 depicts an exemplary energy dispersive spectroscopy EDS result for the VITON® composite material sample having 20% POSS incorporated with 3% CNTs by weight of the polymer VITON®.

Example 5

Surface Energies of the Prepared Composite Material/Outermost Layer

A surface energy analysis for the prepared VITON® composite samples was given in Table 1. As shown, the average surface energy values for the VITON® composite material/outermost layer having 5% POSS and 20% POSS were close to a comparable VITON® layer with no POSS added.

In contrast, the average surface energy values for CNT-containing VITON® composite materials were lower. In particular, the VITON® composite material/outermost layer having 5% POSS incorporated with 3% CNTs were observed to have a very low surface energy with a low concentration of small spherical features (<20 μm) on the composite surface. This material provided similar structural surface features to a lotus leaf, which displays primary features of about 10 μm in size and secondary features of about 1 μm in size.

TABLE 1

| Material | SFE - 0.1 s | SFE - 1 s | SFE - 10 s | Average Surface Energy (mN/m$^2$) |
|---|---|---|---|---|
| VITON ®/5% POSS | 23.35 | 23.20 | 23.43 | 23.33 |
| VITON ®/20% POSS | 25.95 | 25.23 | 25.50 | 25.56 |
| VITON ®/5% POSS/3% cNT | 18.80 | 18.52 | 18.76 | 18.69 |
| VITON ®/20% POSS/3% cNT | 19.94 | 20.72 | 20.53 | 20.40 |

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A fixing member comprising:
a substrate; and
an outermost layer formed over the substrate, wherein the outermost layer comprises a plurality of silsesquioxane-based particles and a plurality of carbon nanotubes dispersed in a polymer matrix.

2. The member of claim 1, wherein the polymer matrix comprises one or more polymers selected from the group consisting of silicone elastomers, fluoropolymers, polyperfluoroethers, fluorinated polyethers, fluorinated polyimides, fluorinated polyetherketones, fluorinated polyamides, or fluorinated polyesters.

3. The member of claim 1, wherein the polymer matrix comprises a fluoroelastomer comprising a cure site monomer and a monomeric repeat unit that is selected from the group consisting of vinylidene fluoride, hexafluoropropylene, tetrafluoroethylene, perfluoro(methyl vinyl ether), perfluoro (propyl vinyl ether), perfluoro(ethyl vinyl ether), and mixtures thereof.

4. The member of claim 1, wherein each particle of the plurality of silsesquioxane-based particles comprises a fluorinated group, a hydrophobic group, a reactive group, or combinations thereof,
wherein the fluorinated group comprises a linear fluorinated alkyl group, a branched fluorinated alkyl group, a linear perfluoroether group, a branched perfluoroether group, a fluorinated aryl group or combinations thereof;
wherein the hydrophobic group comprises an alkyl group, an aryl group, a fluorinated alkyl group, a fluorinated aryl group, a perfluoroether group, or combinations thereof; and
wherein the reactive group comprises an amino group, a siloxyl group, or a hydroxyphenyl group being capable of covalently bonding to one or more polymer chains of the polymer matrix, or to one or more functional groups that are covalently attached to the one or more polymer chains.

5. The member of claim 1, wherein the plurality of silsesquioxane-based particles are substituted with functional groups selected from the group consisting of hydrogen, substituted alkyl group having from about 1 to about 20 carbons, unsubstituted alkyl group having from about 1 to about 20 carbons, a substituted aryl group having from about 6 to about 60 carbons, an unsubstituted aryl group having from about 6 to about 60 carbons, a fluorinated alkyl group having from about 1 to about 30 carbons, a fluorinated aryl group having from about 6 to about 60 carbons, a substituted siloxy group having from about 1 to about 30 carbons, an unsubstituted siloxy group having from about 1 to about 30 carbons, an amino group having from about 1 to about 10 carbons, a hydroxyphenyl group having from about 6 to about 60 carbons, and mixtures thereof.

6. The member of claim 1, wherein the plurality of silsesquioxane-based particles comprise polyhedral oligomeric silsesquioxanes (POSS) having a particle size of about 1000 nm or less.

7. The member of claim 1, wherein each of the plurality of nanotubes comprises a single wall carbon nanotube (SWCNT), a multi-wall carbon nanotube (MWCNT), or mixtures thereof.

8. The member of claim 1, wherein
the plurality of silsesquioxane-based particles are present in an amount from about 3 percent to about 30 percent by weight of the outermost layer; and
the plurality of carbon nanotubes are present in an amount from about 0.5 percent to about 25 percent by weight of the outermost layer.

* * * * *